E. H. CHAPMAN.
NUT TAPPING MACHINE.
APPLICATION FILED MAY 14, 1913.
1,077,595.
Patented Nov. 4, 1913.
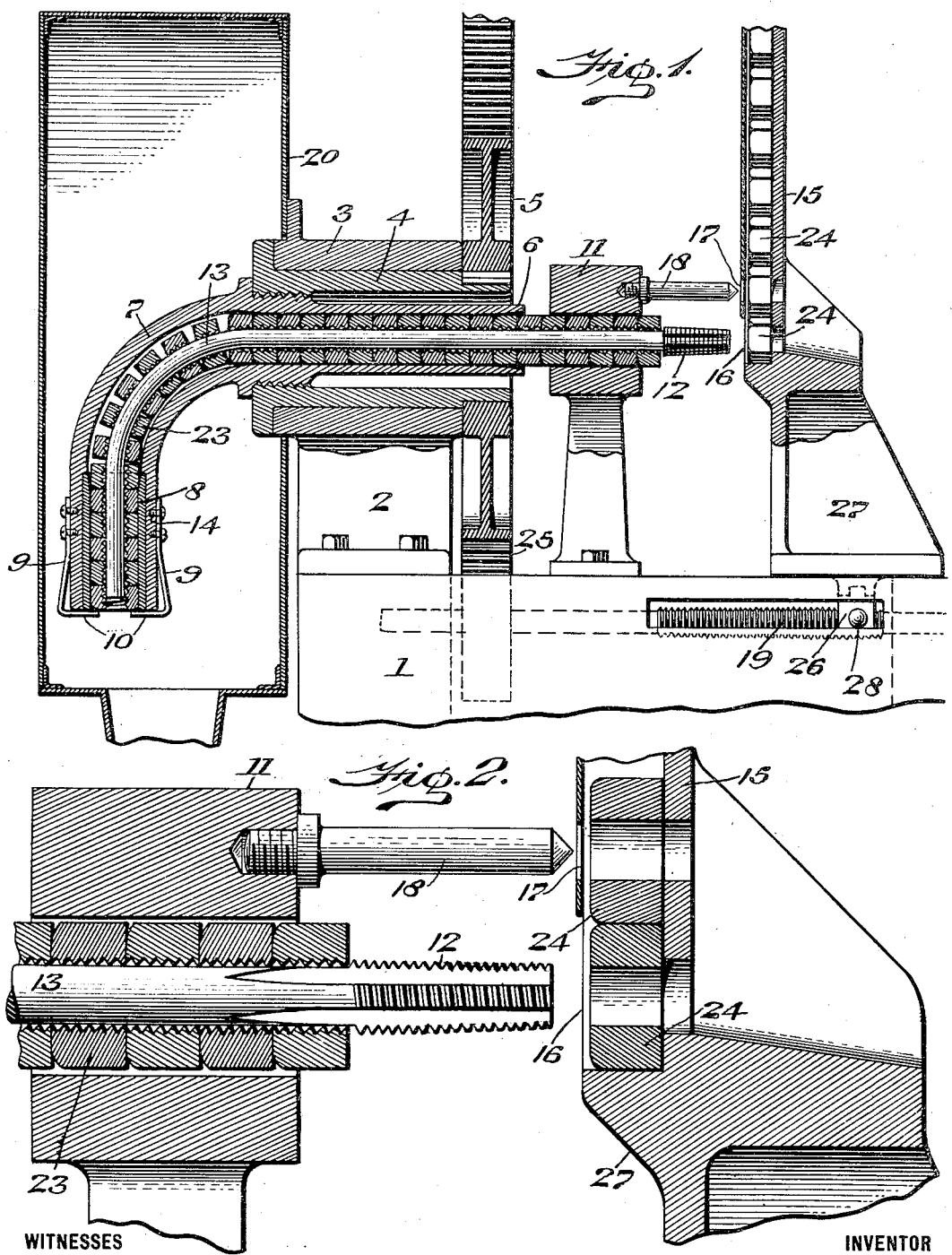
WITNESSES
H. G. Dieterich
P. F. Nagle
INVENTOR
Edward H. Chapman.
BY Hedersheim Fairbanks
ATTORNEYS

UNITED STATES PATENT OFFICE.

EDWARD H. CHAPMAN, OF SAN FRANCISCO, CALIFORNIA.

NUT-TAPPING MACHINE.

1,077,595.  Specification of Letters Patent.  Patented Nov. 4, 1913.

Application filed May 14, 1913. Serial No. 767,586.

*To all whom it may concern:*

Be it known that I, EDWARD H. CHAPMAN, a citizen of the United States, residing in the city and county of San Francisco, State of California, have invented a new and useful Nut-Tapping Machine, of which the following is a specification.

My invention consists of an improved nut-tapping machine in which the nuts to be tapped are fed from a magazine to a rotating tap having an outwardly curved, smooth shank upon which the tapped nuts are successively collected and from which they are finally discharged, one nut on the cutting end of the tap successively crowding off a nut at the discharge end of the curved shank.

It further consists of improved means for retaining the next succeeding nut in the magazine while a nut preceding it is being tapped.

It further consists of improved means for yieldingly retaining the tapped nuts upon the curved shank of the tap to be successively crowded off as additional nuts accumulate upon the tap.

It further consists of other novel features of construction, all as will be hereinafter fully set forth.

The annexed drawings and the following description set forth in detail one mechanical form embodying the invention, such detail construction being but one of various mechanical forms in which the principle of the invention may be used.

In said annexed drawings—Figure 1 represents a vertical sectional view of as much of a nut-tapping machine embodying my invention as will illustrate the same. Fig. 2 represents an enlarged sectional view of a portion of the magazine, the nut-guide and the tap.

Similar numerals of reference indicate corresponding parts in the figures.

Referring to the drawings, the reference numeral 1 indicates the frame or bed of the machine carrying a pedestal, 2, having a horizontal bearing, 3. A sleeve, 4, is journaled in said bearing and has a gear, 5, secured upon it for rotating it. A nut-guiding tube, 6, is secured in said sleeve and has its rear portion, 7, laterally curved. A bushing, 8, is secured in the outer end of said laterally curved portion. Springs, 9, having inwardly bent free ends, 10, are secured upon the outer sides of the laterally curved portion of the guide-tube, and have the inwardly bent ends projecting partly across the open end of the tube to retain the nuts in the same but capable of being spread to release the same by pressure upon the column of nuts within the tube. A nut-guide, 11, is supported upon the machine-bed in axial alinement with the forward end of the guide-tube, and the bore of said guide is of sufficient diameter to admit of the tapped nuts rotating within the same. A tap, 12, has a smooth shank, 13, which is adapted to axially pass through the nut-guide and the straight portion of the nut-guiding tube, and has a curved portion, 14, which passes through the laterally curved portion of the nut-guiding tube. The tap, proper, projects beyond the nut-guide. A vertical or substantially upright magazine, 15, is slidably supported upon the machine-bed to have its lower end register with the nut-guide and the end of the rotating nut-guiding tube and the tap, and said magazine is so constructed as to contain a column of nut-blanks which may be fed at the upper end of the magazine and slide edgewise in the magazine. The lower end of the magazine has an opening, 16, through which a nut-blank can be drawn out as the tapping tool enters and taps the same. The face of the magazine has an opening, 17, registering with a pin, 18, projecting from the face of the nut-guide, and said opening and pin register with the hole in the blank next succeeding the nut blank, being tapped in the lowermost end of the magazine. The magazine and its pedestal are movable upon the machine-bed and may be drawn toward and from the tap and nut-guide by means of a screw, 19, corresponding to the threads in the nut, or by other means.

In practice, a number of nuts, 23, are placed upon the tap and within the nut-guiding tube to steady the tap within the latter. When the magazine is loaded with nut-blanks, 24, and the spindle or sleeve and the nut-guiding tube and the tap therein are rotated, the magazine is fed toward the tap which enters the lowermost nut-blank in the same and cuts a thread in the same. While the magazine moves toward the nut-guide, the pin upon the latter engages the hole in the nut-blank in the magazine above the one being tapped and holds the same in place. When the nut is tapped, the magazine is drawn back, the tapped nut remains upon the tap and is drawn out of the magazine, and, as soon as the pin is released from the next nut-blank in the magazine, such blank drops down and the magazine is again fed to the tap, to thread such next nut, and so forth, the nut-blanks being fed into the magazine as the tapped nuts are withdrawn. The tapped nuts pass from the tap to the smooth shank of the same, and as tapped nuts are thus fed through the nut-guiding tube, the nuts are successively crowded out to spread the retaining springs and allow the nuts to one by one drop out of the end of the tube. A casing, 20, preferably surrounds the laterally curved portion of the nut-guiding tube to catch the tapped nuts and guide them to a suitable receptacle.

Any suitable means may be provided to feed the magazine toward and from the tap. In the drawings is disclosed a screw, 19, threaded to correspond to the threads of the tap, and journaled in the machine bed and connected by suitable gearing, 25, to rotate in the same direction as the tap. The screw engages a nut, 26, upon the base of the pedestal, 27, which carries the magazine and slides upon the machine-bed, and said nut is of such construction that it may be disengaged from the screw when a nut is tapped, whereupon the pedestal can be manually slid back by a handle, 28, or otherwise moved by suitable means not forming any part of the present invention.

Other modes of applying the principle of my invention may be employed for the mode herein explained. Change may therefore be made as regards the mechanism thus disclosed, provided the principles of construction set forth respectively in the following claims are employed.

Having thus described my invention, what I claim as new and desire to secure by Letters Patent, is:—

1. In a nut-tapping machine, a rotatable nut-guiding tube having a laterally curved rear portion, a tap in such tube and having its smooth shank correspondingly curved, means for successively feeding nut-blanks upon said tap and shank, and springs secured to the sides of the rear portion of said nut-guiding tube and having inwardly bent ends projecting partly across the open end of the same.

2. In a nut-tapping machine, a rotatable nut-guiding tube, a nut-guide registering with said tube, a tap in said tube and guide and projecting beyond the latter, a magazine adapted to contain a column of edgewise arranged nut-blanks and formed with a discharge-opening registering with the nut-guide and through which the tapped nut may be withdrawn and with an opening registering with the hole in the next adjoining nut, means for moving such magazine toward and from said tap and nut-guide, and a pin upon the nut-guide and adapted to enter the opening in the magazine and the hole of the nut-blank adjoining the one being tapped to hold the column of blanks until the tapped nut is withdrawn.

EDWARD H. CHAPMAN.

Witnesses:
 MARK P. SARRINE,
 MAURICE ASHE.